June 17, 1969      J. J. MARTIN      3,450,415
MULTI-POSITIONABLE TRAILER LANDING GEAR STRUCTURE
Filed Aug. 8, 1967      Sheet 1 of 2
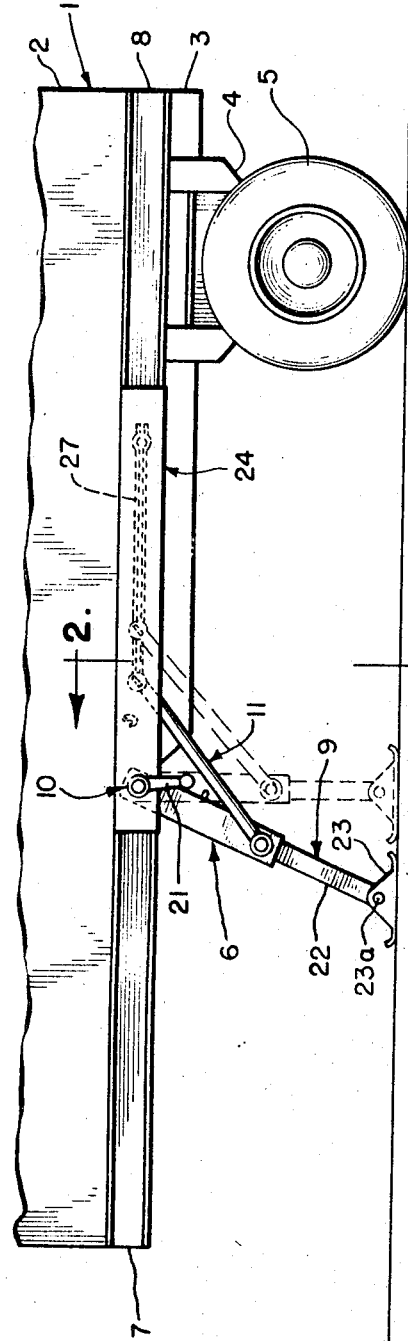
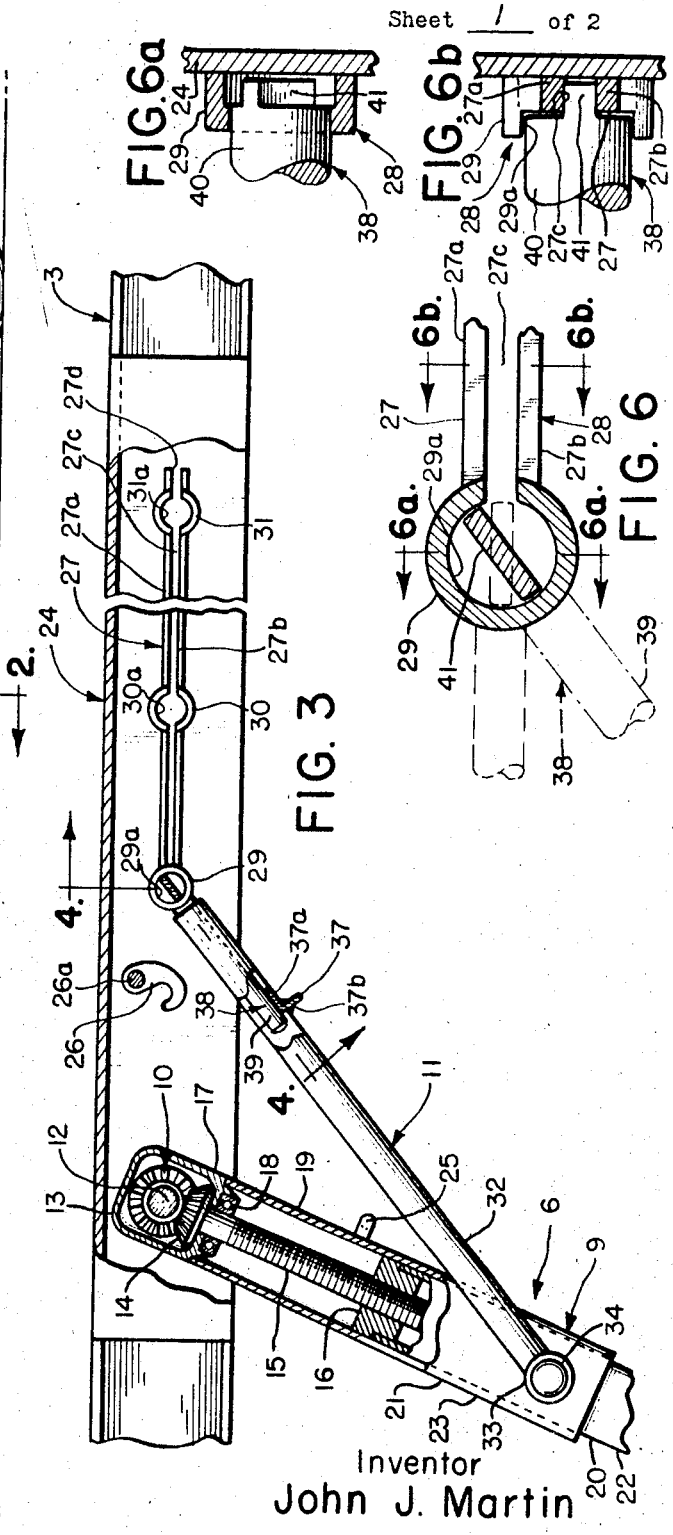
Inventor
John J. Martin
By Richard J. Myers
Attorney

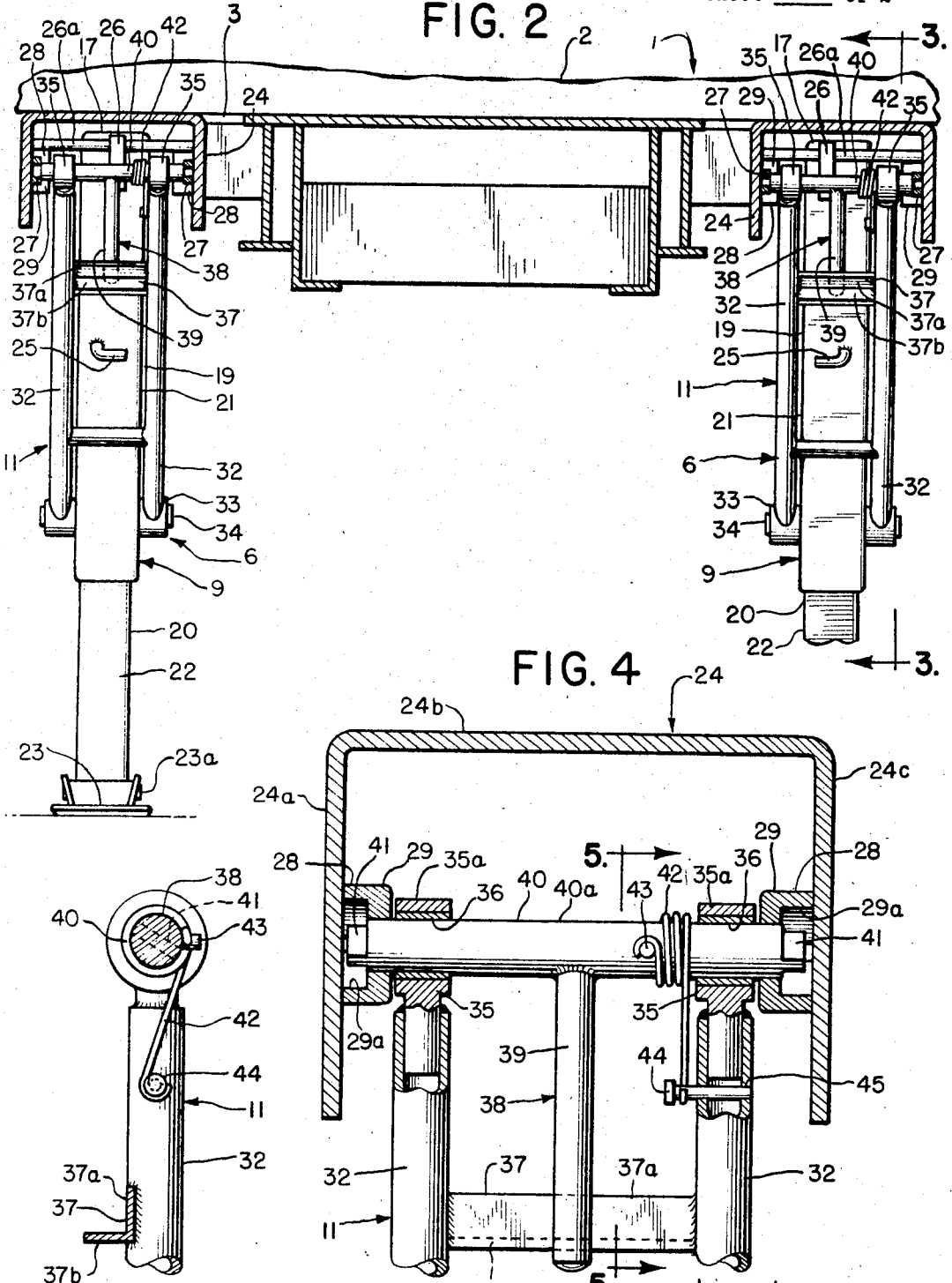

Patented June 17, 1969

3,450,415
MULTI-POSITIONABLE TRAILER LANDING GEAR STRUCTURE
John J. Martin, Warminster, Pa., assignor to Pullman Incorporated, Chicago, Ill., a corporation of Delaware
Filed Aug. 8, 1967, Ser. No. 659,137
Int. Cl. B60s 9/08, 9/22, 11/00
U.S. Cl. 280—150.5
8 Claims

ABSTRACT OF THE DISCLOSURE

A multi-positionable landing gear structure that is adapted for depending pivotal mounting to the underframe structure of a trailer and comprising a pivotal leg structure pivotally connected to the trailer underframe and having pivotally attached thereto a diagonal brace structure which is also pivotally attached to the trailer underframe, the diagonal brace structure pivotally carrying a diagonal brace lock means that is biased for engagement with said grace structure and movable there away from for rotation of its flat ends to align themselves in longitudinally extending slots in the frame structure attendant to alignment and movement of said diagonal brace and said leg structure from a first position to a second position where in the first position the landing gear leg structure is inclined and in the second position the landing gear leg structure is in an upright position and wherein said leg structure may be moved to and held in a third or out of use position underneath the trailer underframe.

BACKGROUND OF THE INVENTION

(1) Field of invention

This invention relates to the field of landing gears for trailers or the like whereby the trailer may be supported not only by a bogie suspension but also by landing gear legs awaiting coupling of the trailer to another truck or cab unit to be pulled along the highway as a semi-trailer. The invention here particularly relates to a multi-positionable landing gear to accommodate various sized trailers.

(2) Description of the prior art

Heretofore separate anti-nosedive legs are normally required for the trailer, due to the near center location of the landing gear on short trailers and containers and it is a purpose, object and advantage of this invention to provide for the folding type landing gear for use on short trailers and container chassis to eliminate the need for such a separate anti-nosedive leg arrangement.

SUMMARY

The invention covers a slanted type folding landing gear arrangement for use on short trailers and container chassis and has for a principal object to eliminate the need for a separate anti-nosedive leg arrangement normally required. The object of the invention is obtained by providing diagonal brace means for positioning each of the normally vertical landing gear legs in a forwardly slanted manner. In this forwardly slanted position the landing gear legs are toward the front of the trailer preventing the trailer from nosediving when being loaded. When it is desired to move a landing gear leg from the slanted position to the vertical position a lock of a brace means is manually manipulated against the force of an associated spring means until the diagonal brace lock is in the horizontal position whereby the lock is slidable along its respective horizontal slotted structure on the trailer frame and allows for the pivotal movement of the pivotally attached landind gear leg. Enlarged openings are provided at a plurality of positions on each slotted structure on the trailer to allow the spring biased lock to assume a position where the diagonal brace means supporting the leg cannot be moved to any other position and therefore the leg cannot be moved to any other position. Thus, a number of positions may be assumed by each pivotal landing gear leg from a forwardly inclined position to an upright position to a folded position underneath the trailer or to some other position depending on how many openings are provided for the ends of the diagonal brace lock. Means are also provided for locking the landing gear leg underneath the trailer frame.

BRIEF DESCRIPTION OF THE DRAWINGS

FIG. 1 is a partial side view of a trailer employing the novel multi-positionable landing gear structure of the invention;

FIG. 2 is a partial sectional view taken along line 2—2 of FIG. 1;

FIG. 3 is a sectional view taken along line 3—3 of FIG. 2;

FIG. 4 is a sectional view taken along line 4—4 of FIG. 3;

FIG. 5 is a sectional view taken along line 5—5 of FIG. 4;

FIG. 6 is an enlarged partial view of the connection of the landing gear lock arrangement with the lock slide arrangement on the trailer frame shown in FIG. 3;

FIG. 6a is a partial section taken along line 6a—6a of FIG. 6; and

FIG. 6b is a sectional view taken along line 6b—6b of FIG. 6.

DESCRIPTION OF THE PREFERRED EMBODIMENT

With reference now to the drawings, there is seen a trailer 1 (FIG. 1) having a body or container 2 and a chassis structure 3. The chassis structure 3 is provided with the usual suspension 4 and wheel arrangement 5 which may be of a conventional slidable bogie type construction. A landing gear structure 6 (FIGS. 1, 2 and 3) is provided between the fore portion 7 and the aft portion 8 of the trailer 1, one such landing gear structure 6 being on each side of the trailer. The following described construction and operation of each structure 6 is the same and discussion is limited therefore to the left structure 6. The pivotal landing gear 9 of the left landing gear structure 6 is provided with landing gear pivot means 10 pivotally connecting the landing gear structure 6 to the trailer. A pivotal diagonal brace structure 11 is pivotally connected to the landing gear 9 and to the trailer 1 and for this purpose there is provided a pivotal shaft 12 which also may drive bevel gears 13 and 14 to rotate threaded screw shaft 15 to allow the threaded nut 16 attached to lower leg portion 22 to move therealong. The landing gear 9 is provided with an upper fixed casing 17 carrying a journal 18 for the shaft 15 and is further provided with a lower fixed casing 19 and a lower movable casing 20 casings 17 and 19 being part of the upper fixed leg portion 21 and casing 20 being part of the lower movable leg portion 22 which at its lower end has a pivotal foot or ground support 23 held thereto by pivot 23a.

The crank handle 21a (FIG. 1) when operated raises and lowers leg portion 22 by way of gears 13, 14 and nut 16 to adjust the length of leg 10 in the conventional manner. A channel shaped housing 24 on each side of the trailer is provided for storage of its respective gear structure 6 and is U-shaped in construction being open at the bottom and having flange part 24a, 24b and 24c (see FIG. 4) and being mounted to the trailer chassis 3. The landing gear 9 is provided with a landing gear mounted storage lug 25 which couples to the housing mounted storage lug 26 for holding the landing gear 6 in a horizontal position, the housing mounted storage lug 26 being carried by support pin 26a held in the parts 24a and 24c of the channel housing 24. Each housing 24 carries slotted guide channel means 27 including an upper guide rail or element 27a and a lower guide or rail element 27b defining a track opening or guide passage 27c therebetween. The guide channels 27 define the slotted guide means 28 which also has enlarged round opening means or apertured portions 29, 30 and 31 (see FIGS. 3, 6, 6a and 6b) including an inside bore 29a, 30a and 31a.

Each pivotal diagonal brace structure 11 comprises a pair of downwardly extending tubular members or arms 32 connected together by a cross arm 33 (see FIG. 2) at their lower ends thereof and pivotally connected as by pivot pin 34 to the respective landing gear leg 9. The upper end of each tubular member 32 is provided with a journal arm 35 having a journal or eye 35a provided with a bearing surface 36. Each pair of arms, 32, 32 of a particular diagonal brace structure 11 are kept apart from one another and held in proper parallel alignment by a spreader element 37 (see FIGS. 2, 4 and 5) having an L-shaped configuration and comprising flange parts 37a and 37b. Each diagonal brace structure also is provided with a diagonal brace lock 38 having a handle 39 pivotally turning the journal structures 35a, 35a of each of the arms 32, 32. Each bearing rod 40 is generally round or cylindrical cross section and carries by bearing surface 36 each of the arms 32, 32, the outer ends of the bearing rod 40 having reduced flat end portions 41, 41 which are received in the large round openings 29, 30 or 31 of each of the slotted guide means 28 and also may be received in the slotted elongated guide channel 27c. A tension spring 42 is wrapped around a respective bearing rod 40 and has one end connected to the spring shaft pin 43 on shaft 40 and the other end connected to the arm pin 44 in the pin opening 45 of one arm structure 32. The spring 42 tends to rotate the diagonal brace lock 38 in a counter-clockwise direction as view in FIG. 3.

When it is desired to move either landing gear 9 from the slanted position as shown in solid line on the drawings to the vertical position as shown in dotted line in the drawings (see FIGS. 1 and 3), the handle 39 of the lock 38 is pushed manually in a clockwise direction as seen in FIG. 3 away from the stop or spreader element 37 against which the handle 39 rests due to the force of the spring 42, as viewed in FIG. 3, until the diagonal brace lock end or flats 41, 41 are in a horizontal position as viewed in FIG. 6 in dotted line, the diagonal position of the flats 41, 41 being shown in solid line. The flat ends 41, 41 are then in alignment with the horizontal slot or guide opening 27c of the slotted guide channel 27 for movement therealong. The landing gear legs 9, 9 are then free to rotate about the pivot means 12, 13 until the landing gear leg 9 is in the vertical direction as shown in dotted line in FIG. 1. During this motion of the landing gear leg 9, the ends 41, 41 slide through the horizontal slot 27c between the guides 27a and 27b. During the first part of this motion, immediately after the ends 41, 41 have entered the slots 27c the pressure that was applied to the handle 39 against the spring 42 can be released. When the pivotal landing gear 9 is in the vertical position as shown in FIG. 1 in dotted line, the lock ends 41, 41 are in the second pair of openings 30, 30, in the guides 27, 27, and the force of the spring will allow the ends 41, 41 to rotate into the slanted position, thereby fixing the diagonal brace 11 in this position and consequently hold the leg 9 in a vertical position. The leg 9 may be moved to a further position to the right as seen in FIG. 3, along the guide means 28 to where the ends 41, 41 of the diagonal brace lock 38 may be placed within the bore 31a of the enlarged opening 31 whereby the leg 9 will be in a horizontal position and stored underneath the trailer within the U-shaped frame or housing 24. The slotted guide channels 27, 27 at their extreme right end (see FIG. 3) have an open end 27d to allow for assembly and disassembly of the brace structure 11. The opening means 31 also allows for a storage position for the leg unit 9.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. A multi-positional landing gear structure for a trailer or the like comprising: a pivotally suspended landing gear, brace means connected to said landing gear, trailer chassis mounted guide means having connection with said brace means, said brace means pivotally carrying lock means, said lock means having biasing means connecting therewith and with said brace means, said lock means being received in and movable along said guide means, said guide means having keying means receiving said lock means and allowing pivoting of said lock means against said biasing means wherein said biasing means urges said lock means in said keying means to a locked position whereby said brace means cannot be withdrawn through said guide means.

2. A multi-positional landing gear structure for a trailer or the like comprising:
   a pivotally suspended landing gear,
   a diagonally extendable brace means pivotally connected to said landing gear,
   trailer chassis mounted guide means having a pivotal connection with said brace means, said brace means comprising arm means for extension between the trailer chassis and the landing gear,
   said arm means pivotally carrying a diagonal brace lock means,
   said lock means having biasing means connecting therewith and with said arm means,
   said lock means being provided with pivotal ends for insertion into and slidable along said guide means,
   said guide means having keying apertured means to allow rotation of the lock means against said biasing means for receiving said ends and said biasing means urging said ends to a locked position whereby said ends cannot be withdrawn from said apertured means.

3. A landing gear structure for a trailer or the like comprising:
   a pivotally mounted landing gear leg,
   a diagonally extendable brace structure adapted for connection to said leg and to the trailer,
   trailer mounted guide means provided with a guide channel means and having a plurality of keying portions along the guide channel means,
   said brace means pivotally carrying a lock arrangement,
   said lock arrangement comprising pivotally suspended lock portions receivable in said guide channel means and said keying portions, and
   biasing means mounted on said lock arrangement and urging said lock portions to the locking position in the keying portions, and
   handle means operative to move said lock portions to the unlocking position in said keying portions to allow movement thereof of the lock means in said guide channel means whereby said brace means moves said pivotal landing gear leg between upright and inclined positions for supporting the trailer.

4. The invention according to claim 3, and
   said guide means being provided with a further keying portion connecting said guide channel means opening for permitting said landing gear leg to assume a stored horizontal position underneath the trailer.

5. The invention according to claim 3, and said trailer having trailer mounted channel structure carrying said guide means, said landing gear leg having a storage lock thereon and said trailer channel mounted structure having a storage lock thereon for locking said landing gear to the underside of said trailer.

6. The invention according to claim 3, and said leg having a fixed portion and a movable portion reciprocally disposed with respect to the fixed portion for the extension and concentration of the leg.

7. A multi-positionable landing gear structure for a trailer comprising:

a depending pivotally mounted landing gear leg means, brace means being pivotally connected with the leg means, trailer mounted guide means for guiding said brace means being pivotally connected with said brace means, lock means connected with said brace means and comprising a vertically extending handle and a cross shaft connected with said handle, said shaft being pivotally connected with said brace means, spring means operatively connecting with said shaft and with said brace means and urging said handle in engagement with said brace means, said shaft having end portions having lugs, said guide means comprising an elongated channel, a plurality of enlarged openings in said channel, said lugs being slidable through said elongated channels and into said enlarged openings whereupon said spring means urges said lugs to prevent entry of said lugs into said channel.

8. The invention according to claim 9, and said keying means comprising enlarged apertured portion means.

References Cited
UNITED STATES PATENTS

| | | | |
|---|---|---|---|
| 2,889,154 | 6/1959 | De Lay | 280—407 |
| 1,711,059 | 4/1929 | Marklein | 280—150.5 |
| 1,895,170 | 1/1933 | Nabors | 280—150.5 |

BENJAMIN HERSH, *Primary Examiner.*

R. R. SONG, *Assistant Examiner.*